May 15, 1928.　　　　　　　　　　　　　　　　　　　1,670,178
R. M. ZEARING, JR., ET AL
DISPENSING DEVICE
Filed Feb. 6, 1923　　　　2 Sheets-Sheet 2
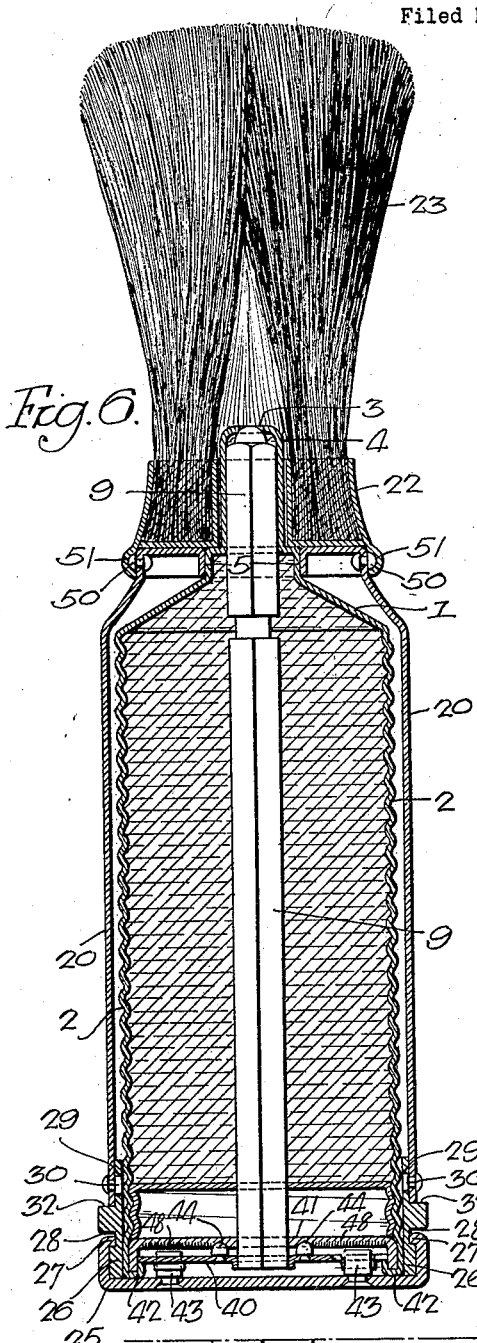
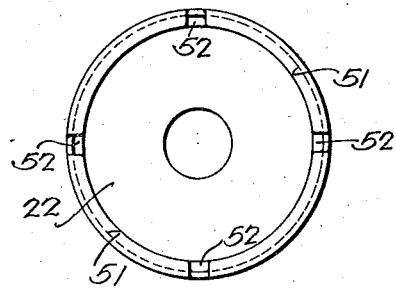
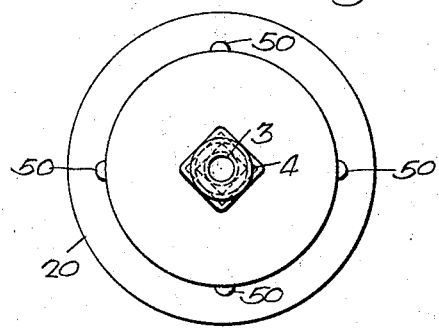
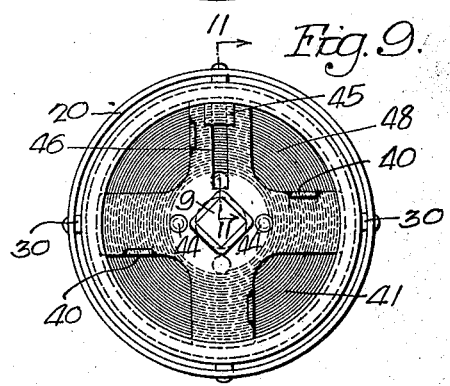
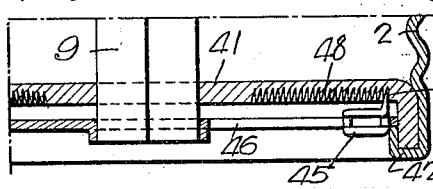
Inventors.
Robert M. Zearing, Jr.
Charles J. Ottenthal.
by their Attorneys.

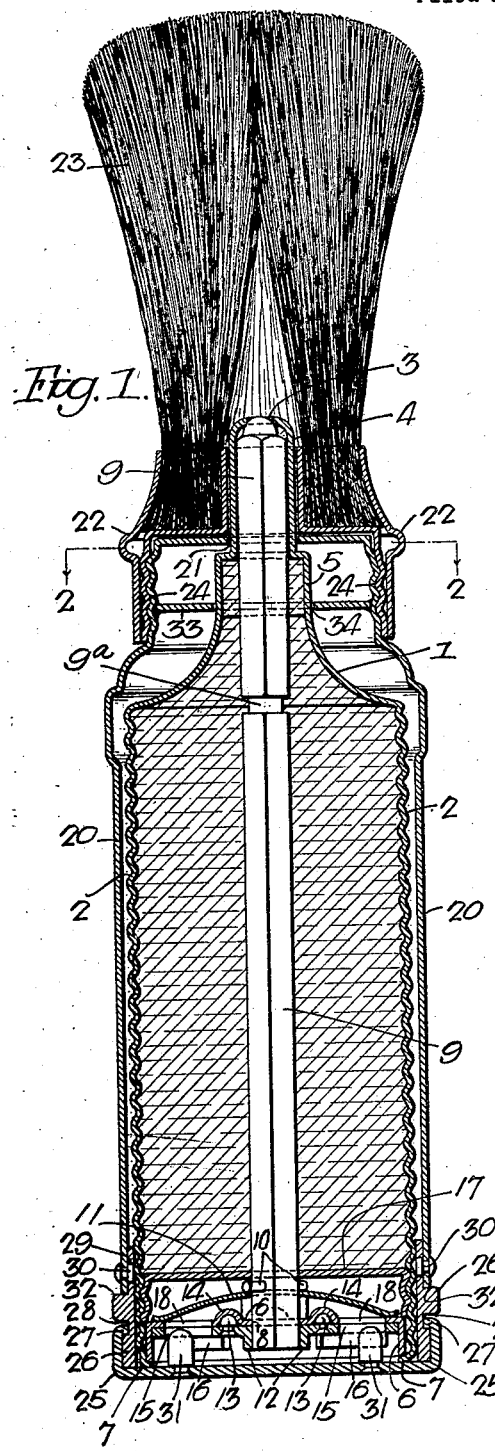
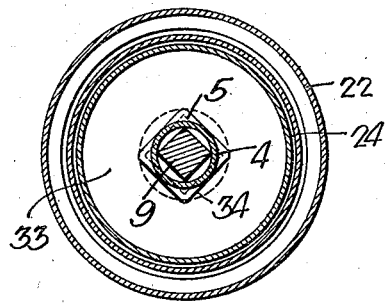
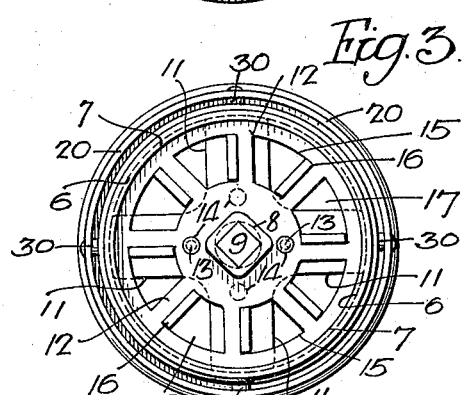
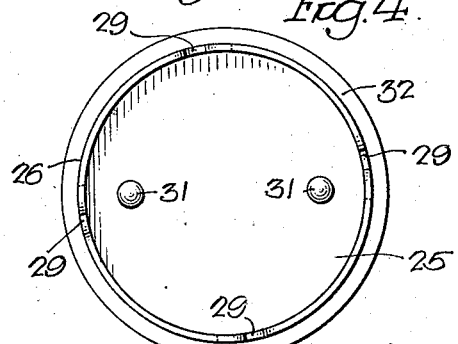
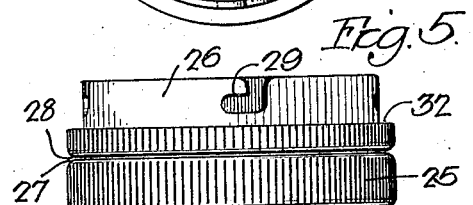

Patented May 15, 1928.

1,670,178

UNITED STATES PATENT OFFICE.

ROBERT M. ZEARING, JR., AND CHARLES J. OTTENTHAL, OF PHILADELPHIA, PENNSYLVANIA, ASSIGNORS, BY DIRECT AND MESNE ASSIGNMENTS, TO ROBERT M. ZEARING, JR., OF PHILADELPHIA, PENNSYLVANIA.

DISPENSING DEVICE.

Application filed February 6, 1923. Serial No. 617,310.

This invention relates to dispensing devices, and more particularly to that class of dispensing devices comprising a cartridge-container or refill for the dispensed material and a casing into which the cartridge detachably fits.

One object of the invention is to provide a dispensing device of this type in which the operations of inserting and removing the cartridge in and from the casing are reduced to the extreme of simplicity.

Another object is to provide a device of the type stated in which the construction of the casing is greatly simplified, involving no parts coming in contact with the dispensed material.

A further object of the invention is to provide means for determining the amount of the material remaining at any time in the cartridge.

A still further object is to provide the cartridge with a valve controlling the discharge opening and automatically operative when the feeding mechanism is operated to uncover the opening intermittently to permit the discharge of predetermined limited quantities of the contained material.

Another object is to provide means for preventing caking of the material in the cartridge around the discharge opening.

A further object of the invention is to provide a novel cartridge or refill which comprises in itself the mechanism, including a plunger, for discharging contained material.

A further object is to provide means for indicating the position of the plunger in the cartridge.

Another object is to provide means for automatically disconnecting the plunger from the feed mechanism when the plunger reaches the discharge end of the cartridge whereby further manipulation of the feed mechanism has no effect upon the plunger.

It is further contemplated to provide a casing for the cartridge which is practically waterproof whereby the device, when used in connection with shaving brushes and the like, is not subject to the passage of water into the interior of the casing and into the cartridge.

The mechanism by means of which these and other objects appearing hereinafter are accomplished is illustrated in the attached drawings, in which:

Figure 1, is a longitudinal section through a fountain shaving brush embodying our invention;

Fig. 2, is a section on the line 2—2, Fig. 1;

Fig. 3, is an inverted plan view of the device with the cap of the casing removed;

Fig. 4, is a plan view of the cap;

Fig. 5, is a side elevation of the cap;

Fig. 6, is a longitudinal section through a fountain brush illustrating modifications within the scope of the invention;

Fig. 7, is an inverted plan view of the bristle-holding ferrule;

Fig. 8, is a plan view of the casing with the ferrule removed;

Fig. 9, is an inverted plan view of the casing containing the cartridge, the bottom closure being removed;

Fig. 10, is a view in perspective of the indicator rider, and

Fig. 11, is an enlarged fragmentary section on the line 11—11, Fig. 9.

With reference to the drawings, the device comprises a cartridge 1, cylindrical in form and having pressed or otherwise formed in the interior thereof a thread 2. The cartridge has in one end a discharge opening 3, the cartridge at this end in the present instance being drawn out into an elongated reduced nozzle 4, in the end of which the said opening 3 is located. This drawn-out end portion also includes at the base of the nozzle 4 a polygonal formation 5, the purpose of which will be hereinafter described.

In the opposite end of the cartridge is secured a fixed end plate 6, this plate in the present instance being confined in the barrel of the cartridge by beading or spinning over the edge of the barrel, as indicated at 7. The plate 6 has a central circular aperture 8 through which projects a rectangular stem 9, the stem extending the length of the cartridge on the inside, and having its upper rounded end normally closing the discharge opening 3. The stem is confined within the cartridge by means, in the present instance, of a pin 10 which passes through the stem inside of the plate 6, and bears against the top of the dished spring 11 whose edges bear against the inside of the said plate 6. As previously stated, the end of the stem 9 projects through the circular opening 8 in the plate 6, and secured to this projecting end is a disk or plate 12 which normally lies against the under side of the plate 6, as shown in Fig. 1.

The plate 12 is provided with four semicircular protrusions 13 arranged in a circle concentric with the plate and separated in the present instance by 90° angles, these protrusions being adapted to occupy four similarly arranged recesses 14 in the under side of the fixed plate 6, as illustrated in Fig. 1. These projections or knobs 13 when the plate 12 is rotated ride out of these recesses and thereby force the plate 12 outwardly away from the plate 6, the plate 12 carrying with it in this movement the stem 9 to which it is attached. The plate 12 has also in the present instance a series of apertures 15, 15, which are formed by pressing out segments of the metal of this plate so that these pressed-out portions of metal 16 project outwardly at right angles from the disk 12, as shown in Figs. 1 and 3, thereby forming wings which provide contact or a means for gripping the plate 12 for turning it.

Located in the interior of the cartridge 1 and having a central rectangular opening through which the stem 9 extends is a piston or plunger 17, cylindrical in form and having its periphery threaded to correspond with the interior threads of the cartridge. With the arrangement as described and illustrated in Fig. 1, it will be apparent that rotation of the stem 9 effects a longitudinal movement of the plunger 17 in the cartridge due to the co-action between the threads on the plunger and in the barrel of the cartridge.

It will further be noted that the fixed plate 6 is apertured at 18, these apertures corresponding substantially with the apertures 15 in the plate 12 and registering with these latter openings when the plate 12 is in the normal position shown in Fig. 1. Since the spring 11, as shown in Fig. 3, is substantially cross-shaped, these openings 15 and 18 provide a means for ascertaining the position of the plunger 17 in the cartridge and the amount of the contained material which has been discharged from the cartridge.

The stem 9 is grooved near the top, as indicated at 9ª, this groove being so positioned that when the plunger reaches the top of the cartridge, it passes off into this groove and so loses operative contact with the stem. As a consequence, further rotation of the stem has no effect upon the plunger, thus preventing possible jamming and injury to the working parts of the casing hereinafter described. It will also be noted that the upper end of the stem fits neatly the interior of the nozzle 4, a scouring action being thus obtained by the edges of the stem when the latter is rotated, which prevents the caking and hardening of bodies of the contained material around the discharge opening.

There is provided for the cartridge 1 a casing 20, said casing having at one end an opening 21 through which the nozzle 4 projects, and having also at this end in the present instance means for attaching a ferrule 22 containing bristles 23 which constitute a brush. In the present instance, the end of the casing 20 is somewhat reduced and threaded as indicated at 24, the ferrule 22 also being provided with internal threads corresponding to the threads on the casing. As clearly illustrated, the ferrule is centrally apertured, the nozzle 4 projecting through the aperture into the base of the bristles.

The casing 20, which is cylindrical in form, has at its other end a cover or cap comprising in the present instance a member 25 of the usual cap formation, in which is rotatively secured a sleeve 26, the sleeve being secured in the present instance by means of spinning the upper edge 27 into an annular recess 28 in the sleeve. The sleeve 26, as best shown in Fig. 5, is provided with angular slots 29 which with a corresponding number of pins or projections 30 on the inside of the casing 20 form a bayonet joint, by means of which the sleeve and its associated member 25 are attached to the casing.

It will be apparent that the member 25 is freely rotatable with respect to the sleeve 26, and this member is provided in the interior thereof with a plurality of pins or projections 31 which are adapted to engage the flanges or wings 16 projecting, as previously described, outwardly from the plate 12 whereby when the member 25 is rotated, it carries with it the said plate 12 and the stem 9 to which the latter is attached. The sleeve 26, as shown in Figs. 1 and 5, is provided with a suitable seat 32 for the lower edges of the barrel of the casing 20, and that portion of the sleeve 26 immediately below the seat extends to form a grip whereby this sleeve may be rotated if desired independently of the member 25, the periphery of this projecting portion of the sleeve being knurled to provide a suitable grip, as also is the periphery of the member 25.

As shown in Figs. 1 and 2, the casing 20 is provided in the discharge end with a plate or disk 33 having a polygonal opening 34 corresponding to the polygonal form of the portion 5 of the cartridge, this portion 5, when the cartridge is in place in the casing, lying within this aperture 34 in the plate whereby the cartridge is prevented from rotating in the casing.

The operation of the device will be apparent. A cartridge or refill is inserted in the casing by first removing the cover of the latter, it being only necessary to make the portion 5 register with the aperture 34 in the plate 33 which is provided for its reception. Following insertion of the cartridge, the cover may be replaced, the pins 31 assuming naturally their positions in the apertures 15, and the bayonet joints 29—30 being secured by partially rotating the sleeve 26. The device is now ready for operation, and rotation of the member 25, by reason of the contact between the pins 31 and the flanges 16, will effect a corresponding rotation of the plate 12 and of the stem 9 within the cartridge. The initial effect of the rotation of the plate 12 is to carry the projections 13 from the recesses in the fixed plate 6 which they normally occupy, thereby forcing the plate 12 away from the plate 6 and drawing the tip of the stem 9 away from the aperture 3 which normally it closes. Coincident with the uncovering of this discharge opening 3, the plunger 17 is advanced in the cartridge, with the result that a portion of the contents of the cartridge is expelled through the discharge port. With the arrangement illustrated and described, each quarter rotation of the plate 12 effects the opening and re-closing of the discharge port 3 and the discharge therefrom during the period which it is open of a predetermined quantity of the contents of the cartridge.

Although in the present instance we have shown the device adapted for use in a fountain shaving brush and the contents of the cartridge, which in this instance will be a shaving cream, discharged into the base of the bristles, it will be apparent that the device is capable of numerous applications other than this, and that the form of both the cartridge and of the casing may be modified to suit particular conditions. It will further be apparent that numerous modifications in the arrangement of parts and details of construction may be made with no departure from the essential features of the invention.

In the modification of Figs. 6 to 11, we have illustrated a form of our device in which the spring 11 has been eliminated. In this instance, a member 40, corresponding to the plate 12 in Fig. 1 to which the stem 9 is secured, functions as the resilient means for retaining the stem in the normal aperture-closing position. As clearly shown in Figs. 6 and 11, the lower edge of the cartridge is beaded inwardly over the downturned flanged edge of a fixed plate 41, this beaded-over portion 42 of the shell preventing outward movement of the outer edges of the plate 40. In this instance also the plate 40 is apertured for the reception of pins 43, 43, on the member 25 of the casing cap, so that when the latter is rotated the plate 40 is carried with it. As the plate 40 is rotated, projections 44, 44, thereon pass out of the apertures provided for them in the fixed plate 41, thereby flexing the plate 40 outwardly at the center and drawing downwardly the stem 9 so that the port 3 is uncovered. In this instance also, there is provided means for indicating the position of the plunger in the cartridge, the indicator consisting of a rider 45 adapted to travel in a slot 46 in one of the arms of the member 40, this rider which is best shown in Fig. 10 having a portion 47 projecting inwardly and engaging in a spiral groove 48 in the fixed plate 41. The number of convolutions of this spiral groove corresponds to the number of threads in the barrel of the cartridge with which the threaded periphery of the plunger engages, and as the plunger is fed upwardly in the cartridge, the rider 45 moves in its guide towards the center of the member 40, the position of the rider at any time being an exact indication of the position of the plunger in the cartridge.

In this modification also we have illustrated an alternative method of attaching the ferrule of the brush to the casing 20, the casing having at its top a series of projections 50 which, by engaging in a suitable groove 51 in the ferrule, as illustrated in Fig. 6, retain the ferrule on the casing. To permit attachment and detachment of the ferrule, the latter is provided with a number of openings 52 corresponding in number and position to the projections 50 on the casing, so that when the ferrule is turned on the casing into a position in which the openings 52 register with the projections 50, the ferrule may be lifted away from the casing.

We claim:

1. A dispensing device comprising a container having a discharge opening, a plunger in the container, mechanism including a stem in the interior of the container for advancing the plunger therein, said stem normally closing the discharge opening, and means automatically operative upon actuation of the said mechanism to advance the plunger for simultaneously shifting the stem longitudinally to uncover the discharge opening without affecting the normal progress of the plunger.

2. A dispensing device comprising a cylindrical internally threaded container having a discharge opening, a cylindrical plunger in the container having threads engaging the internal threads thereof, mechanism for rotating the plunger in the container, said mechanism including a stem of non-circular cross section projecting into the container, the plunger having a correspondingly shaped aperture through which said stem extends, and said stem constituting also a valve for the discharge opening, and means automatically operative upon actuation of the stem to rotate the plunger, and to shift the stem longitudinally in the container to uncover the discharge opening.

3. A dispensing device comprising a container having a discharge opening at one end, a plunger in the container, mechanism including a rotative stem mounted in the container for advancing the plunger therein, said stem constituting also a valve for the discharge opening, a member fixed in one end of the container and having an aperture for passage therethrough of the stem, resilient means tending to retain the stem in a position closing the discharge opening, an element secured to the stem outwardly of the said fixed member, and interengaging means upon the said fixed member and the element secured to said stem operative when said element is rotated for shifting the stem longitudinally to uncover the discharge opening.

4. A dispensing device comprising a cylindrical internally threaded container having a discharge opening, a plunger in the container having threads engaging the internal threads of the container, a stem in the interior of the container having a connection with the plunger preventing relative rotational movement while permitting relative movement longitudinally of the stem, said stem constituting a valve for the discharge opening, resilient means tending to retain the stem in the aperture-closing position, a recessed member fixed in one end of the container, and an element secured to the stem and having a projection adapted in the aperture-closing position of the stem to occupy the recess, said projection when leaving the recess effecting a longitudinal movement of the stem sufficient to uncover the discharge opening.

5. A dispensing device comprising a container having a discharge opening, a plunger in the container, mechanism including a stem in the interior of the container for advancing the plunger therein, said stem normally closing the discharge opening, means automatically operative upon actuation of said mechanism to advance the plunger for simultaneously shifting the stem longitudinally to uncover the discharge opening without affecting the normal progress of the plunger, and means operative in the normal actuation of said plunger-advancing mechanism for automatically re-closing the valve following a predetermined actuation of the plunger.

6. A dispensing device comprising a container having a discharge opening, a plunger in the container, mechanism including a stem in the interior of the container for advancing the plunger therein, said stem normally closing the discharge opening, means automatically operative upon actuation of said plunger-advancing mechanism for shifting the stem longitudinally to uncover the discharge opening without affecting the normal progress of the plunger, and means operatively associated with the stem for indicating the position of the plunger in the container.

ROBERT M. ZEARING, Jr.
CHAS. J. OTTENTHAL